UNITED STATES PATENT OFFICE.

ROBERT HENRY CLAYTON, OF MANCHESTER, JULIUS HUEBNER, OF CHEADLE HULME, AND HERBERT ERNEST WILLIAMS, OF MANCHESTER, ENGLAND, ASSIGNORS TO THE MANCHESTER OXIDE COMPANY LIMITED, OF MANCHESTER, LANCASTER, ENGLAND.

PROCESS OF TREATING CELLULOSE.

1,301,652.        Specification of Letters Patent.     Patented Apr. 22, 1919.

No Drawing.     Application filed January 4, 1919. Serial No. 269,692.

*To all whom it may concern:*

Be it known that we, ROBERT HENRY CLAYTON, JULIUS HUEBNER, and HERBERT ERNEST WILLIAMS, subjects of the King of Great Britain and Ireland, and residents of Manchester, in the county of Lancaster, England, Cheadle Hulme, in the county of Chester, England, and Manchester, in the county of Lancaster, England, respectively, have invented a certain new and useful Process of Treating Cellulose, of which the following is a specification.

This invention relates to the treatment of celluloses in the production of solutions and viscous or gelatinous bodies or masses thereof, and it has for its object to provide a new or improved process of so treating celluloses.

We have found that technically useful solutions of celluloses and viscous or gelatinous bodies or masses thereof can be obtained by the treatment of cotton and other celluloses with solutions of, or containing, thiocyanates. Some of the thiocyanates, e. g. the thiocyanates of calcium, manganese, strontium and lithium, will act satisfactorily alone. In other cases satisfactory results are obtainable by employing two or more thiocyanates in conjunction, as e. g. by dissolving water-insoluble or sparingly-soluble thiocyanates in solutions of readily or more readily water-soluble thiocyanates, or by partly replacing the thiocyanate solutions by solutions of other salts, e. g. calcium chlorid, which do not adversely affect the action of the thiocyanate or thiocyanates and which themselves do not dissolve celluloses. The thiocyanate solutions or mixtures of solutions may be acidified, preferably with acetic acid. It will, of course, be understood that the thiocyanate solutions may also be partly replaced by solutions of other salts which themselves are solvents of celluloses.

The following examples will serve to illustrate how the new process may be carried into effect.

Example 1.

4 grams of cotton or other cellulose, preferably dry, are placed in 100 c. c. of calcium thiocyanate solution of specific gravity 1.38. The mixture is stirred, heated to 100° C. and the heating continued for one hour with agitation. The temperature is then raised to 120° C. and maintained until solution of the cellulose is obtained.

Example 2.

4 parts of cotton or other cellulose are placed in 100 c. c. of a solution containing 70 grams of sodium thiocyanate and 70 grams of mercuric thiocyanate and the mixture treated as in Example 1.

Example 3.

30 c. c. of calcium chlorid solution, containing 86 grams of $CaCl_2$ per 100 c. c. of solution, are added to 70 c. c. of calcium thiocyanate solution containing 76 grams of thiocyanate per 100 c. c. of solution. The solutions are thoroughly mixed, 4 grams of cellulose are added and the mixture subsequently treated as in the previous examples.

The working solutions operate best when they are of high concentration. The substitution of a salt for a part of the thiocyanate solution thus diluting the thiocyanate solution is chiefly made for the purpose of economy since in certain cases the volume of solution necessary to conveniently treat a given weight of cellulose would, if highly concentrated, contain more thiocyanate than is required to dissolve the cellulose. In such cases it is possible to use a smaller quantity of such a solution and to make up the necessary volume by adding thereto a solution of salt which does not reduce, or appreciably reduce the concentration of the thiocyanate. Thus in practice, when the process is carried out according to Example 3, calcium thiocyanate of a concentration of 76 grams of thiocyanate per 100 c. c. solution is employed. 100 c. c. of working solution are necessary to conveniently treat four grams of cellulose, but it does not require 76 grams of calcium thiocyanate to dissolve same. Therefore, there is used only 70 c. c. of the calcium thiocyanate solution (containing 53.2 grams of thiocyanate which are sufficient to dissolve the cellulose) to which is added 30 c. c. of calcium chlorid solution to make up the working volume of 100 c. c. The 30 c. c. of calcium chlorid solution of the concentration given contains only so much of calcium chlorid as will not dissolve calcium thiocyanate. Hence, the concentration of the latter in the working solution is not reduced but remains in the proportion of 76 grams per 100 c. c. of solution.

In the foregoing examples, the solution of thiocyanate or thiocyanates or mixture of solutions of thiocyanate and other salt, may be acidified by adding acetic acid thereto in the proportion of 4 parts by volume of glacial acetic acid to 100 parts of solution or mixture of solutions. The acidifying of the working solutions increases the capacity of the solutions to dissolve cellulose, and the rate or speed of solution of the cellulose, and also reduces the viscosity of the resultant solution of cellulose.

What we claim as our invention, and desire to secure by Letters Patent is:—

1. The process of treating a cellulose substance in the production of solutions and viscous or gelatinous bodies or masses thereof, which consists in heating the cellulose substance with a thiocyanate solution.

2. The process of treating a cellulose substance in the production of solutions and viscous or gelatinous bodies or masses thereof, which consists in heating the cellulose substance with a substantially insoluble thiocyanate in a solution of a substantially soluble thiocyanate.

3. The process of treating a cellulose substance in the production of solutions and viscous or gelatinous bodies or masses thereof, which consists in heating the cellulose substance with a mixture of a thiocyanate solution and a solution of a salt which does not adversely affect the action of the thiocyanate solution, and which may itself have no dissolving action upon cellulose substance.

4. The process of treating a cellulose substance in the production of solutions and viscous or gelatinous bodies or masses thereof, which consists in heating the cellulose substance with an acidified thiocyanate solution.

In witness whereof we have hereunto set our hands.

ROBERT HENRY CLAYTON.
JULIUS HUEBNER.
HERBERT ERNEST WILLIAMS.